(12) United States Patent
Sasur et al.

(10) Patent No.: US 10,702,807 B2
(45) Date of Patent: Jul. 7, 2020

(54) FILTER ASSEMBLY AND FILTER ELEMENT

(75) Inventors: Timothy M. Sasur, Newington, CT (US); Jeremiah Sazama, Hartford, CT (US)

(73) Assignee: Clarcor Engine Mobile Solutions, LLC, Franklin, TN (US)

( * ) Notice: Subject to any disclaimer, the term of this patent is extended or adjusted under 35 U.S.C. 154(b) by 1525 days.

(21) Appl. No.: 13/141,347

(22) PCT Filed: Dec. 23, 2009

(86) PCT No.: PCT/US2009/069496
§ 371 (c)(1),
(2), (4) Date: Jul. 28, 2011

(87) PCT Pub. No.: WO2010/075564
PCT Pub. Date: Jul. 1, 2010

(65) Prior Publication Data
US 2011/0272340 A1    Nov. 10, 2011

Related U.S. Application Data

(63) Continuation of application No. 12/317,409, filed on Dec. 23, 2008, now abandoned.

(51) Int. Cl.
*B01D 29/21* (2006.01)
*B01D 29/96* (2006.01)

(52) U.S. Cl.
CPC ............. *B01D 29/21* (2013.01); *B01D 29/96* (2013.01); *B01D 2201/295* (2013.01);
(Continued)

(58) Field of Classification Search
None
See application file for complete search history.

(56) References Cited

U.S. PATENT DOCUMENTS

| 5,766,463 A | 6/1998 | Janik et al. |
| 6,238,552 B1 * | 5/2001 | Shannon ................ C02F 1/003 210/282 |

(Continued)

FOREIGN PATENT DOCUMENTS

| DE | 3903675 C2 | 9/1991 |
| WO | 2002053258 A1 | 7/2002 |

(Continued)

OTHER PUBLICATIONS

International Search Report, PCT/US2009/069496, dated Feb. 25, 2010.

(Continued)

*Primary Examiner* — Kara M Peo
(74) *Attorney, Agent, or Firm* — Alix, Yale & Ristas, LLP

(57) ABSTRACT

A filter assembly includes a header, a bowl and a replaceable filter element. The bowl is indexed to have a single installed orientation with respect to the header. The filter element is keyed and indexed to both the bowl and the header, with index structures on the filter element engaging complementary coding structures on both the bowl and the header to define a single installed orientation of the filter element with respect to the filter assembly. The filter element lower end cap includes a notch and the filer media defines a longitudinal channel corresponding in position and configuration to the notch in the lower end cap. The lower end cap and channel in the filter media engage a protrusion inside the bowl. The bowl maintains angular orientation (prevents twisting) of the upper and lower end caps when the filter media is exposed to high differential pressures.

10 Claims, 14 Drawing Sheets

(52) U.S. Cl.
CPC .......... *B01D 2201/296* (2013.01); *B01D 2201/4046* (2013.01); *B01D 2201/4076* (2013.01)

(56) References Cited

U.S. PATENT DOCUMENTS

| | | |
|---|---|---|
| 7,487,875 B2 | 2/2009 | Zimmerman et al. |
| 2004/0103626 A1 | 6/2004 | Warth et al. |
| 2005/0045552 A1* | 3/2005 | Tadlock ............... B01D 35/303 |
| | | 210/440 |
| 2007/0170103 A1 | 7/2007 | Fick |
| 2007/0267338 A1 | 11/2007 | Menez et al. |
| 2008/0142426 A1 | 6/2008 | Greco et al. |

FOREIGN PATENT DOCUMENTS

| | | |
|---|---|---|
| WO | 2003089104 A2 | 10/2003 |
| WO | 2014108260 A1 | 7/2014 |

OTHER PUBLICATIONS

Supplementary European Search Report dated Jun. 20, 2012.
International Search Report, PCT/US2009/069496, dated Jun. 29, 2011.
Office Action issued in connection with a corresponding European Application No. 09 835 869.0, dated Jan. 23, 2014.
European Search Report for European Patent Application No. 17170047.9.

\* cited by examiner

ND FILTER ELEMENT

FILTER ASSEMBLY AND FILTER ELEMENT

CROSS REFERENCE TO RELATED APPLICATION

This application is the National Stage of International Patent Application PCT/US2009/069496, filed Dec. 23, 2009 which is a continuation in part of U.S. non-provisional application Ser. No. 12/317,409 filed on Dec. 23, 2008.

REFERENCE TO RELATED APPLICATION

This application claims the benefit of U.S. patent application Ser. No. 12/317,409 filed Dec. 23, 2008.

TECHNICAL FIELD

This application relates generally to filter assemblies employed in connection with internal combustion engines. More particularly, the present application relates to filter assemblies having a replaceable filter element for removing foreign particles and/or separating water from fuel of the fuel supply system of an internal combustion engine.

BACKGROUND

It has long been recognized that trouble-free operation of an internal combustion engine requires some form of filtering of the fuel consumed by the engine. In particular, the absence of high standards of quality control in diesel fuel supplies dictates that an effective fuel filter be incorporated into the fuel supply system for a diesel engine. It is not uncommon for diesel fuel to contain significant quantities of abrasive particles and water. The abrasive particles present the potential for permanent damage to components of the fuel injection system. The abrasive particles can adversely affect the performance of the fuel injection pump by destroying the ability of the fuel injection pump to precisely meter and deliver fuel at high pressures. The presence of water in the diesel fuel supply can cause corrosion of engine components, and during freezing conditions, can result in interruption of the fuel injection system and/or seizure of moving components.

A number of conventional fuel filter systems perform the dual functions of removing particulate matter from the diesel fuel and separating water from the fuel. Prior art fuel filters have typically been constructed in the form of a metal can, permanently enclosing the filter element in a single use assembly. While these assemblies have proved to be effective and reliable, they are less than ideal in terms of waste of materials and disposal cost. The filter cartridge surrounds and supports a filter element typically constructed of an accordion folded pleated, cylindrical arrangement of filter media, which is usually a paper-like composite of selected fibers, chemically treated to reject water. The pleated cylinder of filter media is typically secured to end caps at each end by adhesive or the like, forcing fluid through the filter media before flowing on to the fuel handling systems.

Conventionally, the disposable filter cartridge is replaced at pre-established intervals of filter usage. In practice, the filter cartridge requirements may vary depending upon such characteristics as the type and make of the internal combustion engine, the specific applications for which the engine is employed, the climate in which the combustion engine is operated and/or regional characteristics as to the quality of the fuel supply. The filter cartridges thus commonly vary as to their dimensions, their capacity, and the qualities of their filter media.

Due to the poor quality of diesel fuel found around the world in off-road (off-highway) applications, it is very common to see a fuel filter media plug with various degrees of oxidized fuel, water, asphaltenes, and organic debris that can create sludge on the surface of the filter paper. As this sludge accumulates, choking off the pore of the media, a differential pressure accumulates across the filter paper. When the differential pressure becomes sufficiently great that the paper cannot support the forces acting on it, the paper is prone to buckling, twisting and ultimately rupture, effectively destroying the filter's ability to function. In order to prevent twisting, buckling and rupture of the filter paper, it is very common in the filtration industry to use a support tube on the inside core of the filter media and extending between end caps at either longitudinal end of the pleated cylinder of filter media. This tube is most commonly plastic or steel, with perforations to allow flow through the tube. While this solution is effective, it adds to the total cost of the filter element, and depending on the size of the perforations, it can cause localized high velocity spots of the filter paper which can lead to some small losses in filter performance.

One of the problems that is frequently encountered in connection with replacement of the filter cartridge is ensuring that the replaced cartridge is compatible with the filtration requirements for the fuel system. Because numerous types and qualities of filter cartridges may dimensionally conform to the base of a given filter system, the replacement filter cartridge frequently does not comply with the specifications for the filter system, thereby jeopardizing the integrity of the fuel filtering system. Use of an incompatible filter cartridge can have very serious effects on the operation of the internal combustion engine, and may also be unnecessarily expensive when a less costly cartridge is fully suitable. Frequently, either the owner or the maintenance personnel servicing the internal combustion engine are totally unaware of the replacement filter cartridge specifications and requirements and unknowingly jeopardize the integrity of the filtering system by using non-conforming filter cartridges. There are also instances where inferior or improper replacement filter cartridges are intentionally installed without the knowledge of the owner or operator of the vehicle.

Increased awareness of environmental protection and recycling of materials have led to a need for more efficient filtration systems having a minimum disposable component. In addition, environmental protection agencies seeking to reduce the volume of waste items associated with the automotive and trucking industries may no longer permit unrestricted disposal of used fuel filters into the normal waste stream, thereby necessitating specialized and consequently more expensive disposal.

SUMMARY OF THE INVENTION

The present disclosure relates to a filter assembly including a header and bowl which interconnect to form a reusable enclosure for a replaceable filter element. The bowl is connected to the header by a rotatable collar with internal ramps that engage radial projections extending from the header. The header defines a fluid flow path from a fuel supply through the filter media and to the fuel system of a vehicle, while the bowl is typically suspended beneath the header and surrounds the filter element to form a sealed enclosure. The bottom of the bowl provides space for accumulation of water separated from the fuel and typically includes a drain cock for release of accumulated water. The bowl is constructed of molded plastic, but other materials and methods of manufacture are compatible with the present disclosure. The bowl may be transparent to permit maintenance personnel to observe water accumulation and/or the condition of the filter media without taking apart the fuel filter assembly. The bowl and header are indexed to each other to define a pre-determined installed orientation of the bowl with respect to the header.

The replaceable filter element includes end caps at either end of a pleated cylinder of filter media, and may not include a center support tube. The end caps at either end of the filter element are each configured to mate with the bowl so that both end caps are maintained in a predetermined orientation with respect to each other to prevent twisting and collapse of the pleated cylinder of filter media. The element upper end cap is configured to mate in a single predetermined orientation with a castellated upper rim of the bowl. The element lower end cap includes a notch configured to mate with a complementary protrusion from the inside surface of the bowl to index the lower end cap to the bowl in a single installed orientation. The mating features of the element upper and lower end caps are arranged in a predetermined orientation with respect to each other so that the respective element mating features are aligned with the complementary features of the bowl.

According to one aspect of the disclosure, the element upper end cap includes a plurality of radially extending tabs arranged to be received in notches in the castellated upper rim of the bowl. The tabs may vary with respect to their radial length and lateral (circumferential) extent, as well as their height measured along a longitudinal axis of the filter assembly. The notches in the castellated upper rim of the bowl may vary in lateral (circumferential) extent to form a compatibility matrix. Each element upper end cap is configured with tabs that define a predetermined installed orientation with respect to the bowl. The tabs may extend beyond the periphery of the upper rim of the bowl and above the castellated upper rim to interact with an appropriately configured upper inside surface of the header. Thus, the upper end cap is indexed to both the bowl and the header, while the bowl is also indexed to the header. Only a properly configured filter element upper end cap will be correctly received in both the bowl and header, allowing the joining of the bowl to the header by the collar.

According to a further aspect, the header may include a downwardly extending skirt having an inner surface and one or more circumferentially spaced key slots or notches. The bowl includes a circumferential shoulder for engagement by an inner rim of the collar. The circumferential shoulder of the bowl has an outside diameter less than the inside diameter of the downwardly extending skirt, and when installed to the header, is received within and surrounded by the skirt. The slots or notches in the skirt are equal in number to and have the same circumferential spacing as the shoulder projections and are adapted to receive the projections when the bowl is inserted into the header. The circumferential shoulder of the bowl includes a projection complementary to the slot or notch in the skirt to define an installed orientation between the bowl and header.

According to another aspect of the disclosure, the element upper end cap forms a keyed, indexed connection with both the bowl and the header at the same time. An improper orientation of the element upper end cap with respect to either the bowl or the header will prevent reception of the bowl and element by the header, since the header and bowl also have a single installed orientation by virtue of the indexed header skirt and bowl shoulder. Together, the element upper end cap, bowl castellated upper rim and shoulder and the header upper inside surface and skirt form a compatibility matrix where the element upper end cap is keyed to both the bowl and header. Each of the bowl, header and element are keyed to both of the other components.

According to a yet another aspect of the disclosure, the element lower end cap includes a V-shaped notch extending inwardly from its periphery. The notched lower end cap forms a corresponding separation of pleats in the filter media to define a V-shaped void extending the length of the cylindrical pleated media. The void extends inwardly from an outer circumference of the cylindrical pleated media more than one half of the distance between the outside and inside circumferences of the cylindrical pleated media. The notched lower end cap and V-shaped void in the media are configured to mate with a complementary protrusion from the inside surface of the bowl. The bowl protrusion projects upwardly from the bottom of the bowl and extends a majority of the height of the bowl measured parallel with a longitudinal axis of the filter assembly. The bowl protrusion has a similar V-shape to the notch and the void and is received in the notch and void as the element is inserted into the bowl during installation. The element is indexed to the bowl by mating features on both the upper and lower end caps. Thus, the angular relationship of the element upper and lower end caps to each other form part of a compatibility matrix between the replaceable filter element and the filter system.

DETAILED DESCRIPTION

Figure 1:
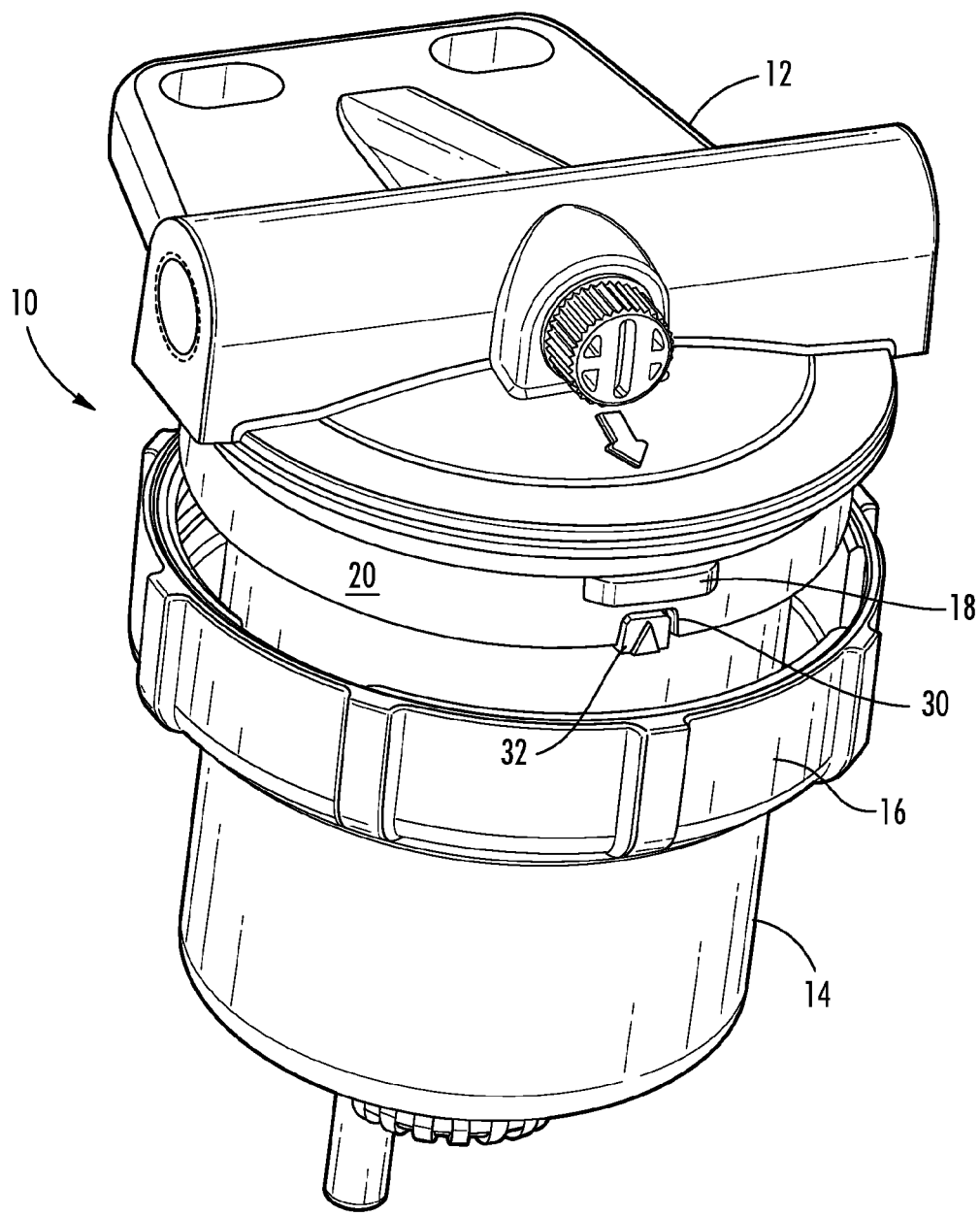
FIG. 1 is a perspective view of a filter assembly according to the present disclosure with the collar released to show indexing between the bowl circumferential shoulder and header skirt.
Figure 2:
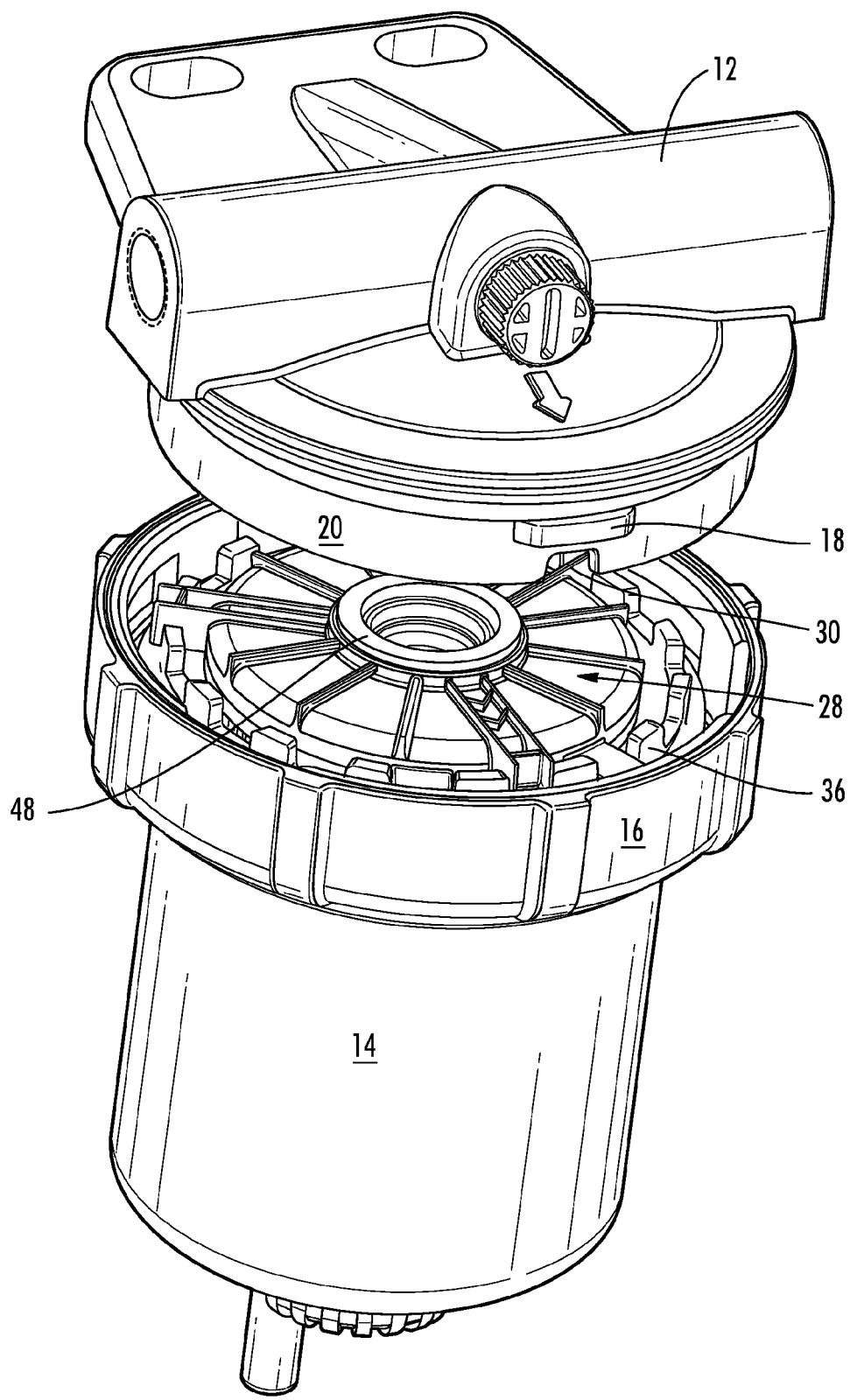
FIG. 2 is a perspective view of the filter assembly of FIG. 1 with the bowl, received filter element and collar separated from the header and received element or bowl of the housing of the filter assembly of FIG. 1.
Figure 3:
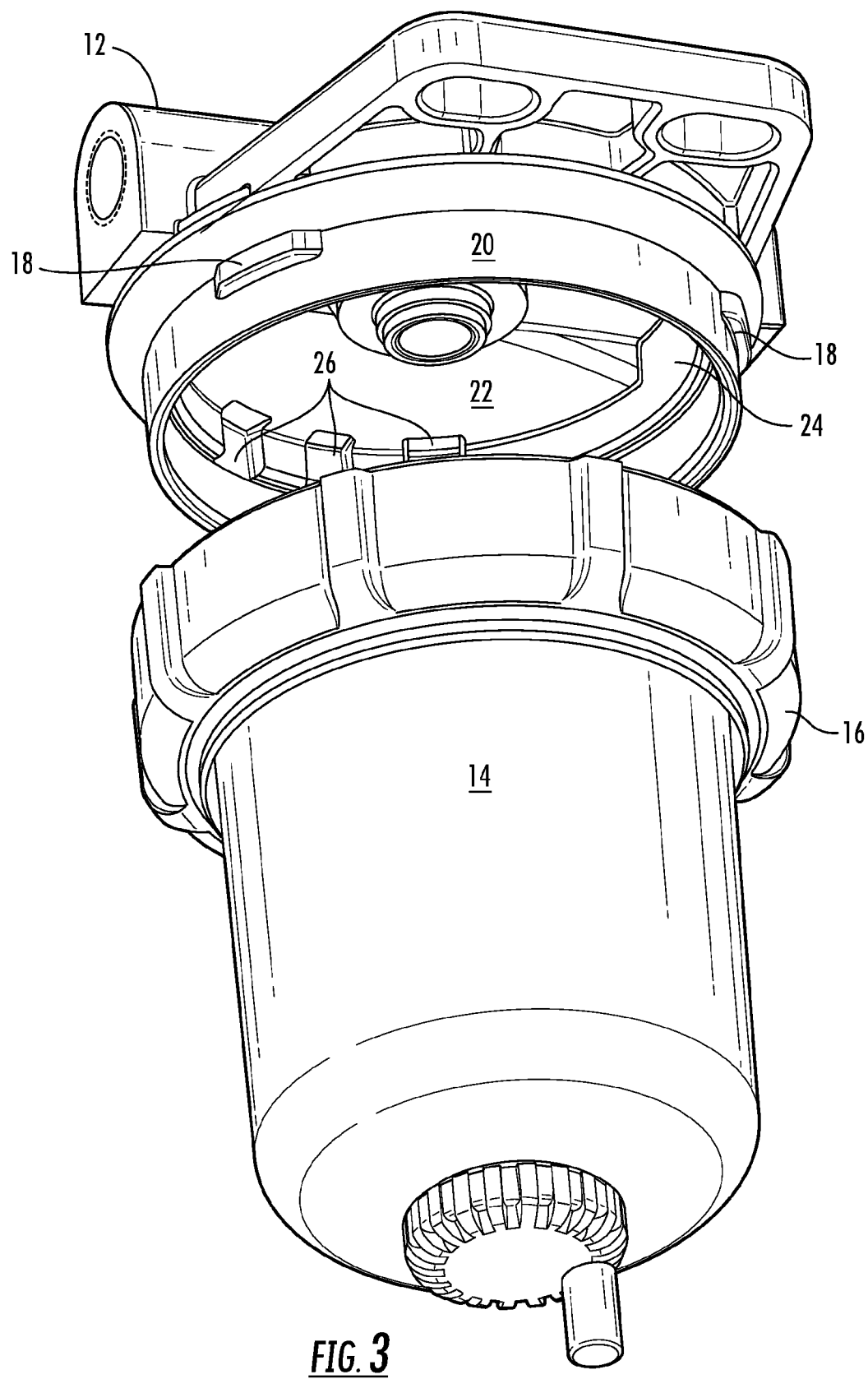
FIG. 3 is a perspective view of the filter assembly of FIG. 2 showing the upper inside surface of the header.

Referring to the drawings and particularly FIGS. 1-3, an embodiment of a disclosed fuel filter assembly 10 comprises a header 12 to which a bowl 14 is secured by a collar 16. The collar 16 is configured with inwardly directed spiral ramps (not shown) that engage bosses 18 projecting from the outside surface of a skirt 20 projecting downwardly from the header 12. As best seen in FIG. 3, the skirt 20 surrounds an upper inside surface 22 of the header 12, which includes an inward and downward projecting code shoulder 24. The code shoulder 24 defines a plurality of code slots 26.

Figure 4:
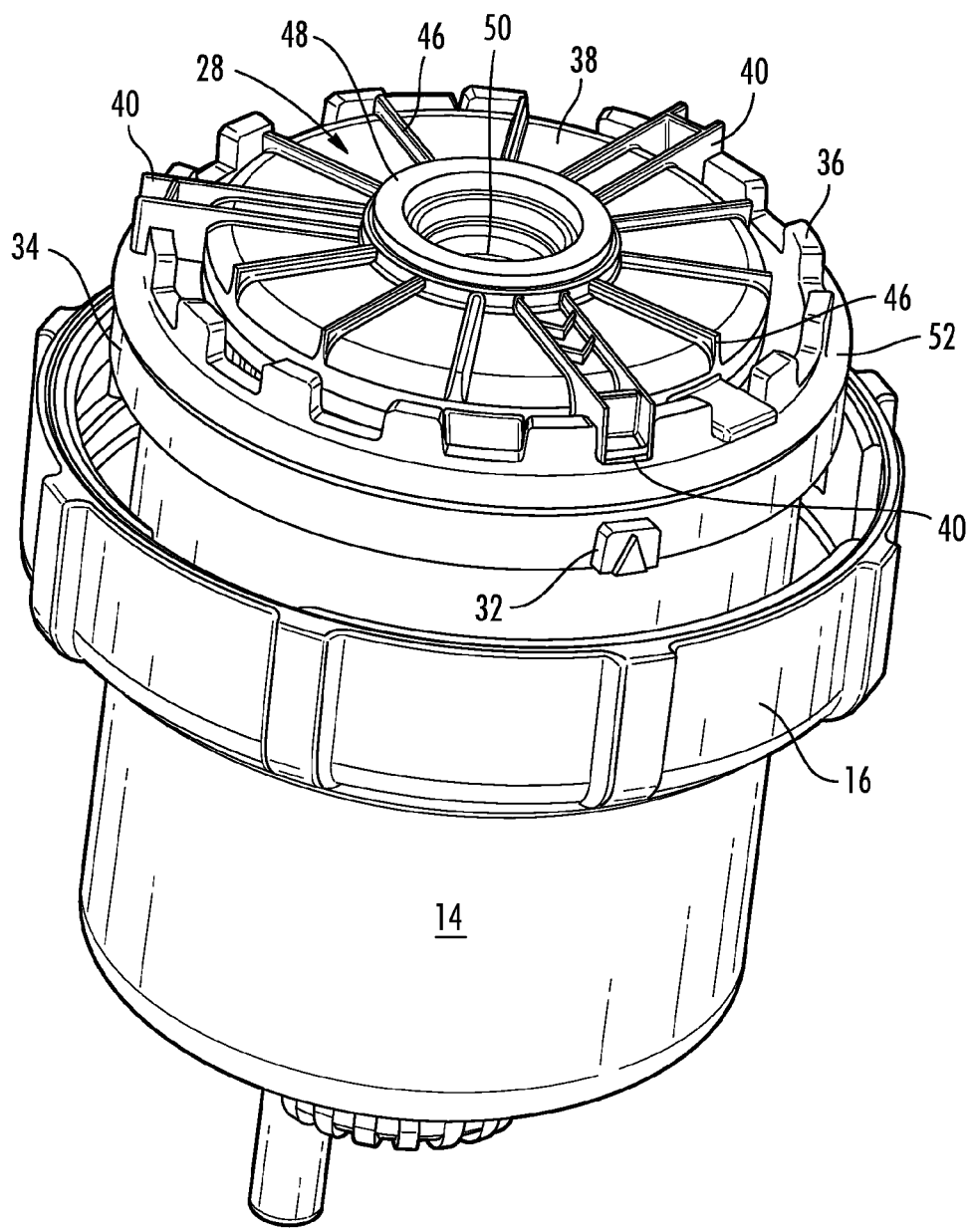
FIG. 4 is a perspective view of the bowl, received filter element and collar of the filter assembly of FIG. 1.
Figure 5:
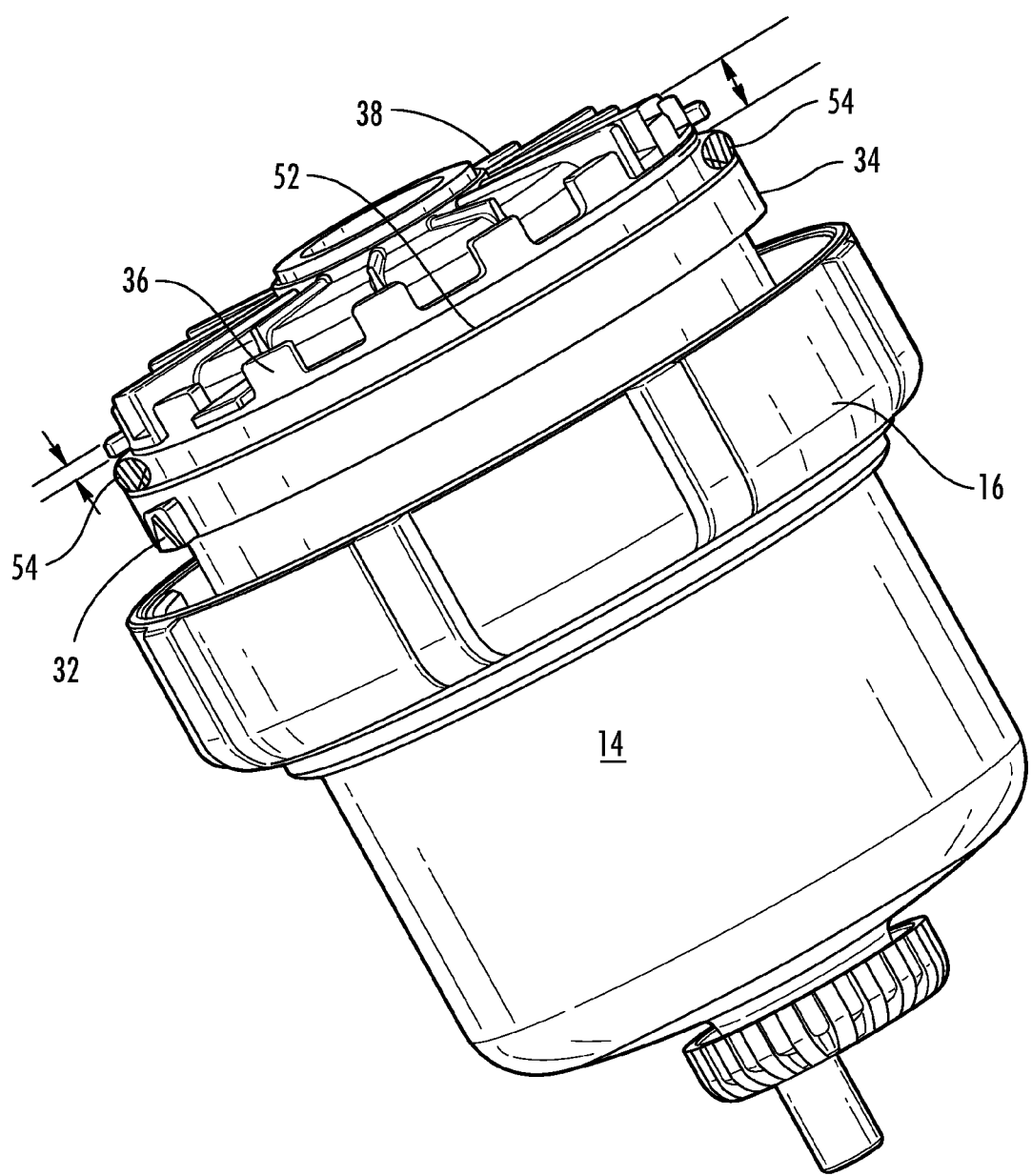
FIG. 5 is a side perspective view of the bowl, received filter element and collar of FIG. 4.
Figure 6:
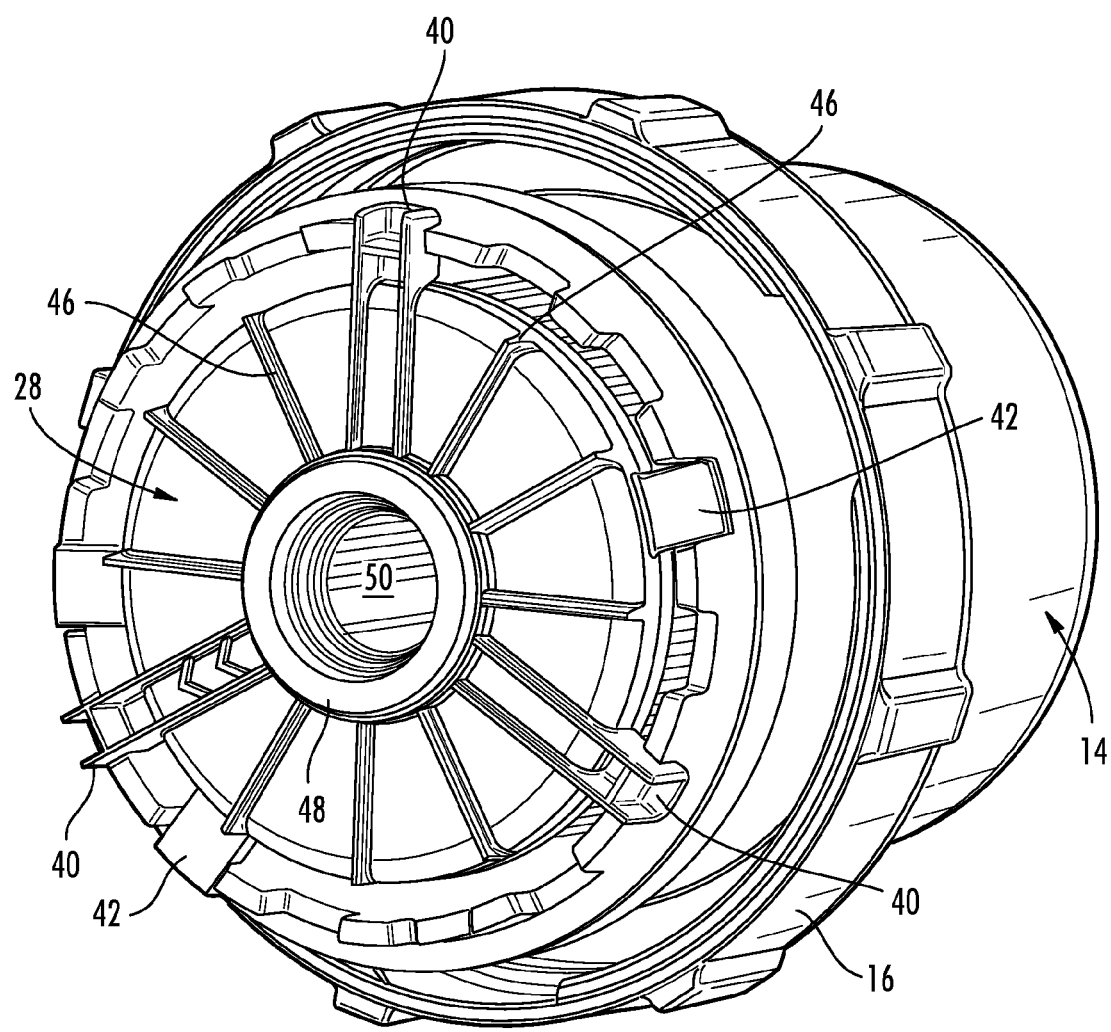
FIG. 6 is an end perspective view of the bowl, received filter cartridge and collar of FIG. 4.

The header 12 and bowl 14 mate to form a sealed enclosure surrounding a received filter element 28 illustrated in FIGS. 2 and 4-11. FIGS. 1 and 2 illustrate a notch 30 defined by the skirt 20 which receives a radially projecting stud 32 or embossment extending from a circumferential shoulder 34 of the bowl 14 as best seen in FIG. 4. Engagement of the stud 32 with the notch 30 in the skirt 20 defines an installed orientation of the bowl 14 with respect to the header 12. FIGS. 2 and 3 illustrate the bowl, received filter element 28 and collar 16 separated from the header 12. The bowl 14 includes a castellated upper rim 36 of the bowl 14 and the received filter element 28 upper end cap 38 indexed to the castellated upper rim 36 by a plurality of radially extending supports 40 and a plurality of radially extending code tabs 42. As best shown in FIGS. 4-6, the radially extending supports 40 extend radially beyond the outside diameter of the castellated upper rim 36 of the bowl 14. The radially extending supports 40 also include a vertical dimension and are molded with vertical support ribs 44 for enhanced structural rigidity.

Figure 7:
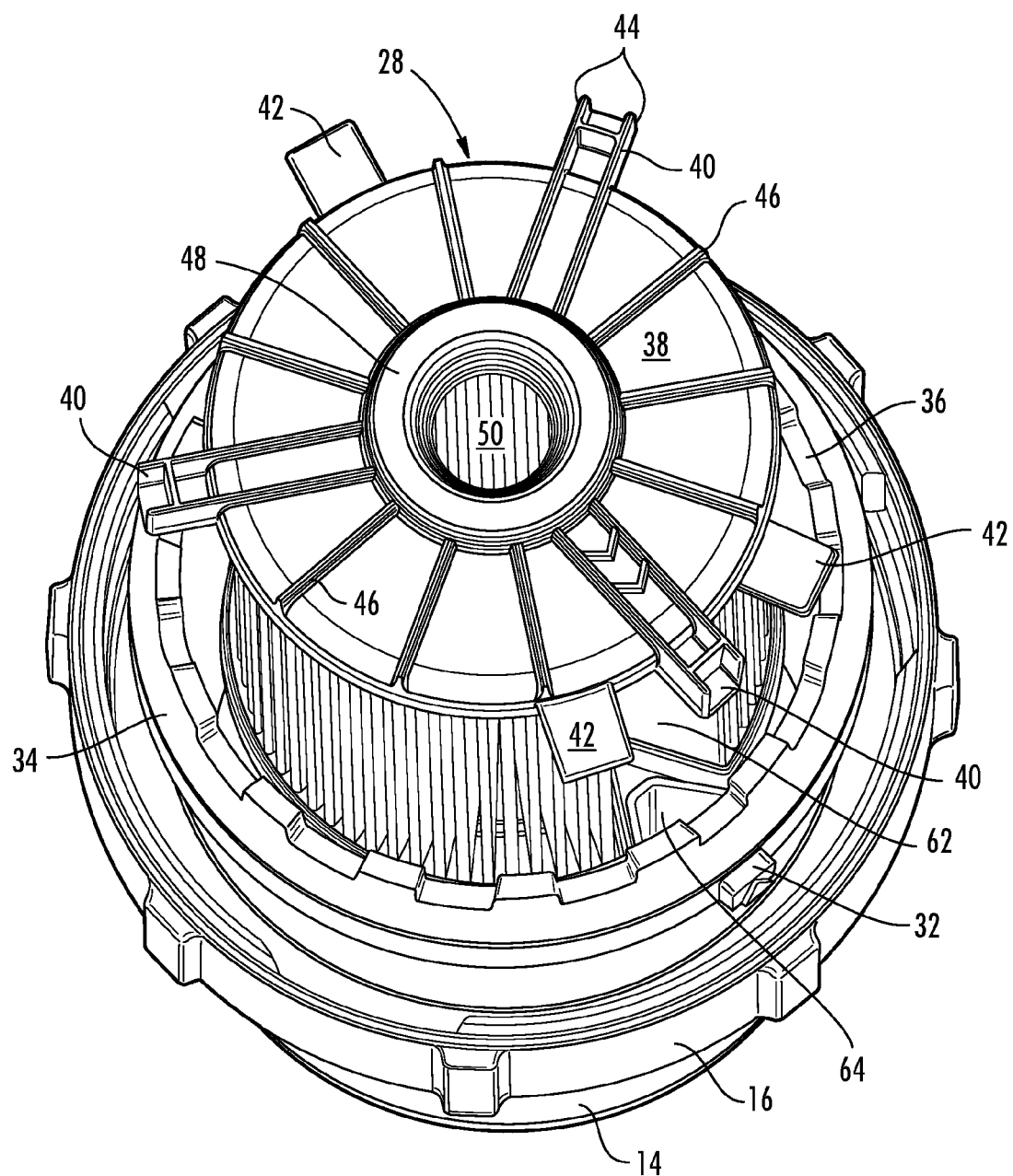
FIG. 7 is a top perspective view of the bowl, received filter element and collar of FIG. 4, with the filter element partially removed to show the relationship of the element lower end cap to the bowl.
Figure 8:
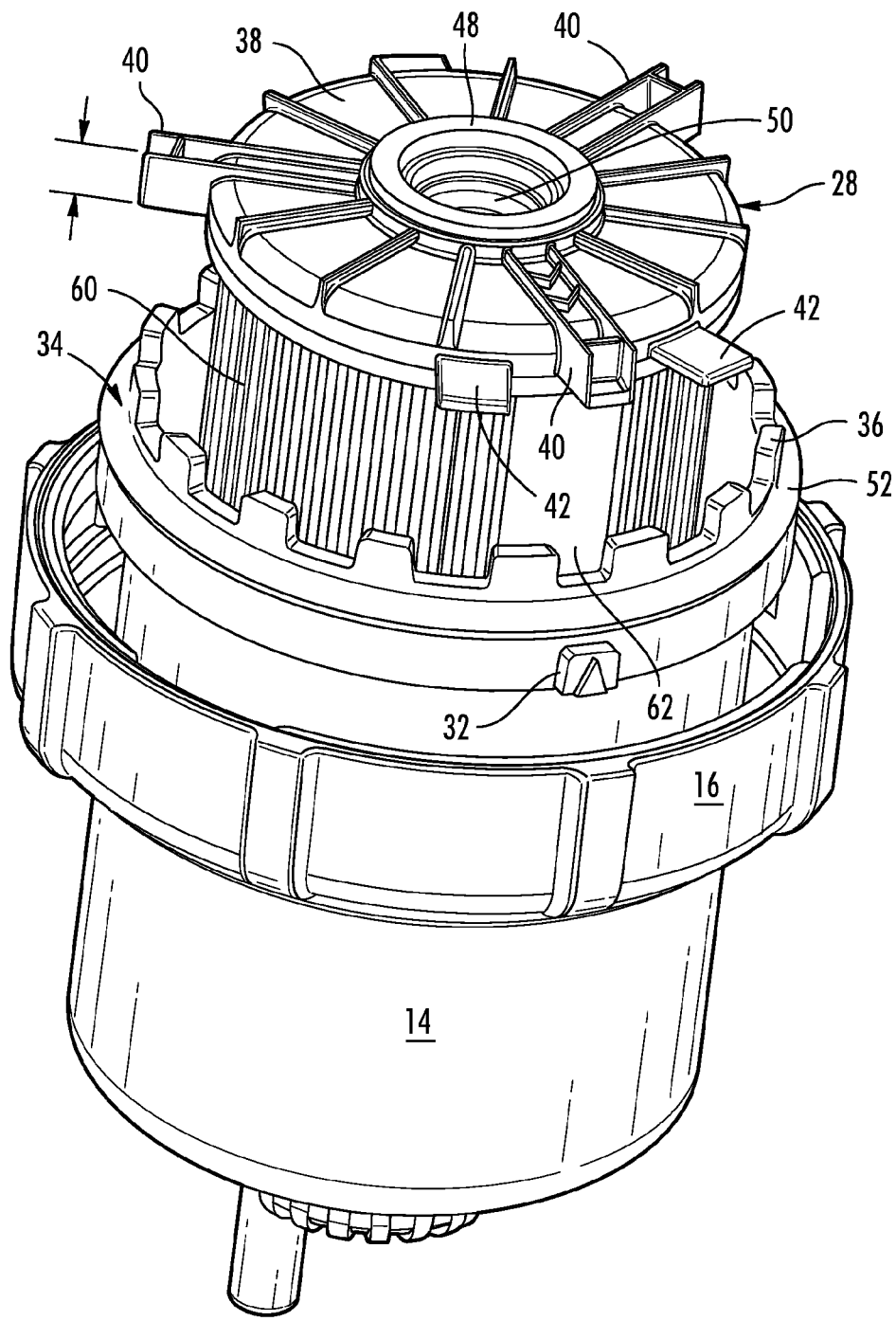
FIG. 8 is a side perspective view of bowl, received filter element and collar of FIG. 7.
Figure 9:
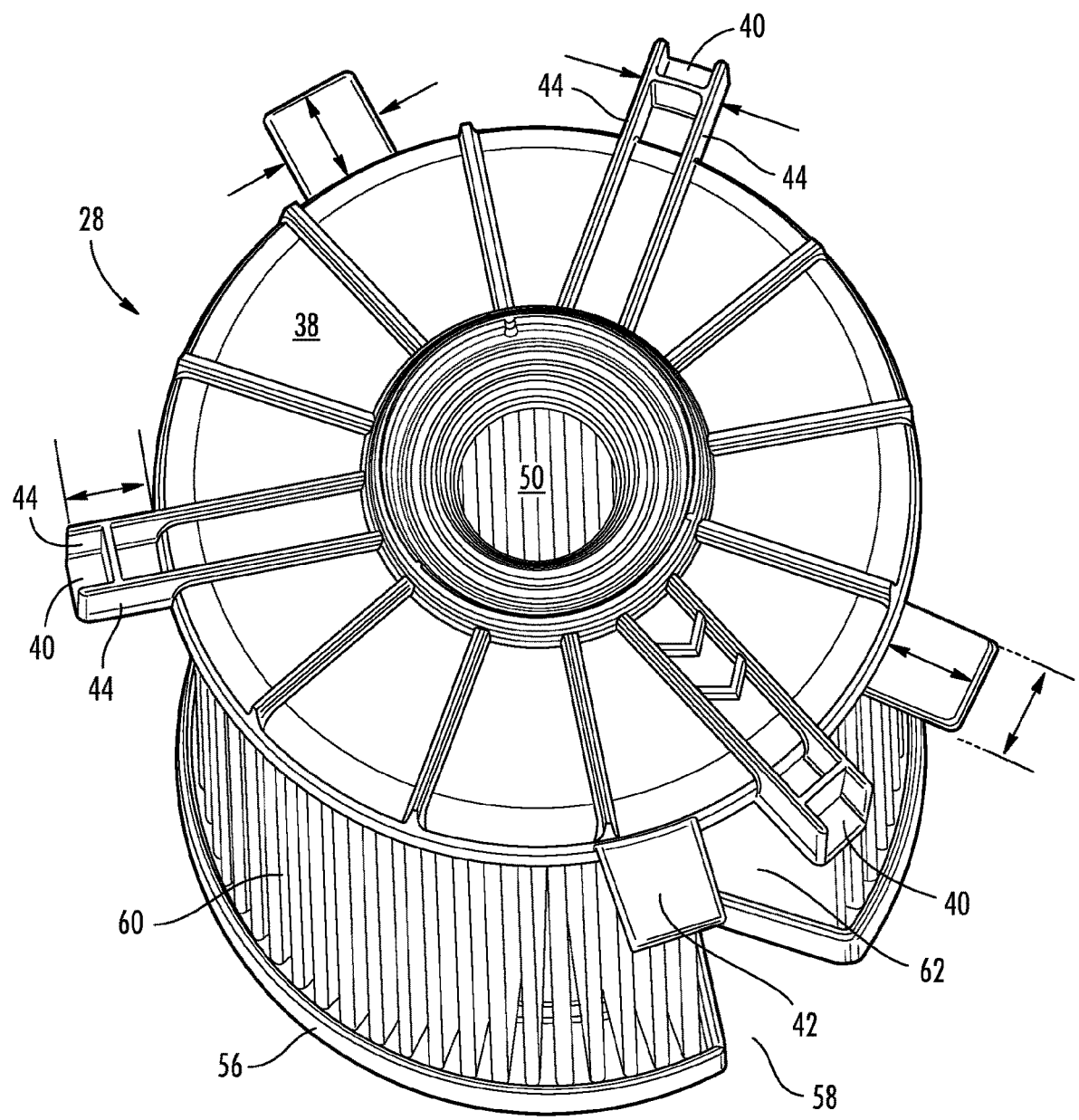
FIG. 9 is a top perspective view of the filter element of FIG. 1 showing details of the upper end cap.
Figure 10:
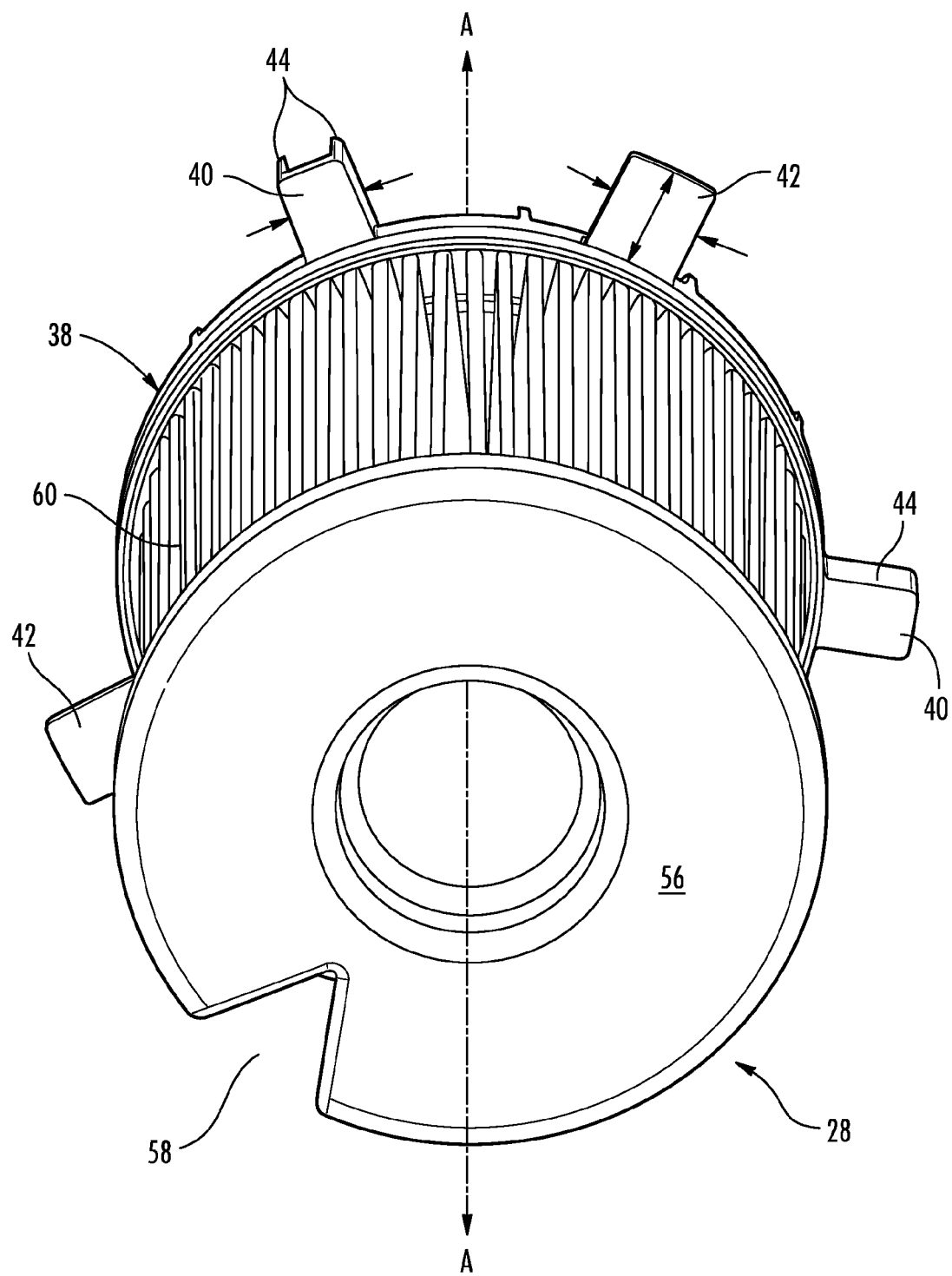
FIG. 10 is a bottom perspective view of the filter element of FIG. 9 showing details of the bottom end cap.

The disclosed filter element 28 upper end cap 38 includes three equiangularly arranged radially projecting supports 40, though other support configurations are compatible with the disclosed filter element and filter assembly. The upper end cap 38 also includes radially projecting ribs 46 to enhance the structural rigidity of the upper end cap 38. At the center of the upper end cap 38 is a ring-shaped seal 48 having a rectangular cross section surrounding a fluid flow aperture 50. Other seal shapes, such as O-rings are compatible with the disclosed filter assembly 10. The plurality of radially projecting supports 40 may vary in their lateral (circumferential) dimension, height (measured parallel with a longitudinal axis A of the filter assembly) and/or the extent of their radial projection. In the disclosed filter element 28, two of the supports 40 have a wider lateral extent than the third, so that the received filter element has a single installed orientation with respect to the bowl 14. FIGS. 6 and 7 best show how the notches in the castellated upper rim 36 of the bowl 14 are configured to mate with the supports 40, e.g., the notches are of equal width at both the inside and outside diameters of the castellated upper rim 36 of the bowl 14. The upward projections of the castellated rim 36 between the notches are trapezoidal or keystone shaped as a result of the notch configuration. The supports 40 center the filter element 28 in the bowl 14 and vertically support the upper end cap 38 with respect to the header 12. The radial ribs 46 and vertical component 44 of the supports 40 provide structural rigidity necessary to support the central seal 48 adjacent the upper inside surface 22 of the header 12 to maintain a fluid seal between the filter element 28 and the header 12.

As shown in FIGS. 4-11, the element upper end cap 38 also includes one or more radially projecting code tabs 42 employed to code particular elements to particular fuel assemblies. The code tabs 42 are in addition to the supports 40. It should be noted that the code tabs 42 are of a simpler structure and a lower vertical profile as the vertical component 44 and rigidity of the supports 40 is unnecessary for the coding function. The code tabs 42 are arranged to mate with predetermined notches in the castellated upper rim 36 of the bowl 14 so that an improperly coded filter element will not be received in a bowl 14. The code tabs 42 may be used to distinguish elements having different filter properties or capacities or to distinguish filter elements compatible with one manufacturer's products from those compatible with the products of another manufacturer. Together, the supports 40 and code tabs 42 form a compatibility matrix defining a single installed orientation of a filter element 28 with respect to the bowl 14.

Figure 14:
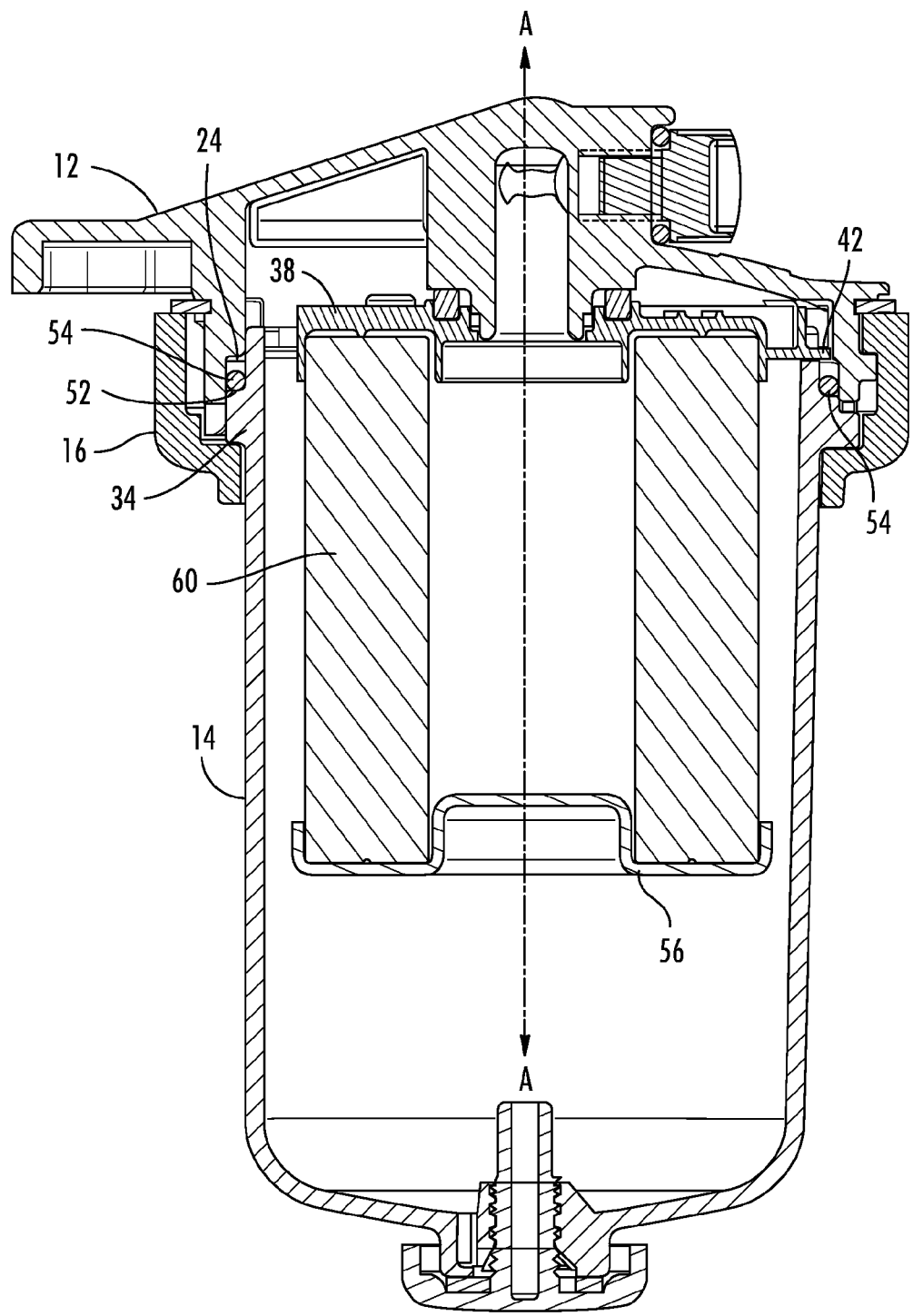
FIG. 14 is a sectional view of the filter assembly showing the sealed relationship between the bowl and header and filter element and header, respectively.

It will be noted that the supports 40 and code tabs 42 extend radially beyond the outside diameter of the castellated upper rim 36 of the bowl 14. Beneath the castellated upper rim 36, the bowl 14 includes a circumferential shoulder 34, the bottom side of which is engaged by an inwardly projecting rim of the collar 16 to support the bowl 14 with respect to the header 12. The upper horizontal surface 52 of the shoulder 34 supports an O-ring seal 54 as shown in FIGS. 5 and 14. The O-ring seal 54 is compressed between the inside surface of the skirt 20 and the outside surface of the castellated upper rim 36 of the bowl 14. The circumferential shoulder 34 of the bowl 14 has an outside diameter less than the inside diameter of the downwardly projecting skirt 20 of the header 12. The outside diameter of the castellated upper rim 36 of the bowl 14 is less than the inside diameter of the code shoulder 24. When the bowl 14 is received in the header 12, the castellated upper rim 36 of the bowl 14 sits inside the code shoulder 24 while the circumferential shoulder 34 of the bowl 14 sits inside the skirt 20. The radially extending ends of the supports 40 and code tabs 42 are received in the vertical code slots 26 defined by the code shoulder 24. Thus, the upper end cap 38 of the filter element 28 is keyed to the header 12 by the configuration of radially extending supports 40 and code tabs 42 mating in a corresponding pattern of code slots 26. According to an aspect of the disclosure, headers 12 are configured with patterns of code slots 26 corresponding to the pattern of supports 40 and code tabs 42 on compatible filter elements 28. Only filter elements 28 with the correct pattern of supports 40 and code tabs 42 are received in the header, while improperly keyed filter elements are rejected.

The filter element upper end cap 38 is keyed to both the bowl 14 and the header 12, while the bowl 14 is keyed to both the filter element 28 and the header 12. The illustrated arrangement employs the pattern of supports 40 and code tabs 42 on the filter element upper end cap 38 as a keyed interface between the bowl 14 and the header 12. An improperly keyed filter element will be rejected, e.g., not fully received in an incompatible header 12, preventing engagement of the ring with the bosses 18, making assembly of an incompatible filter element 28 in the filter assembly 10 impossible. FIG. 3 illustrates a view of the upper inside surface 22 of the header 12 showing the inwardly projecting code shoulder 24 with code slots 26 corresponding to the radially projecting ends of the supports 40 and code tabs 42. The supports 40 and code tabs 42 are configured to traverse the castellated upper rim 36 of the bowl 14 and engage the code slots 26 defined by the code shoulder 24.

It will be noted that one of the supports 40 is provided with arrows which in the illustrations are aligned with a corresponding arrow on the stud 32 projecting from the circumferential shoulder 34 of the bowl 14. The arrows indicate the installed orientation of the filter element 28 with respect to the bowl 14. The stud 32 on the circumferential shoulder 34 of the bowl 14 fits in the corresponding notch 30 in the skirt 20 to define the installed orientation of the bowl 14 with respect to the header 12. For a bowl 14 and received filter element 28 to be received in a header 12, the pattern of supports 40 and code tabs 42 must correspond to the pattern of code slots 26 defined by the code shoulder 24 inside the header 12. A circular O-ring seal 54 is supported by the upper surface 52 of the circumferential shoulder 34 of the bowl 14. A gland above the circular O-ring is defined by the bottom of the code shoulder 24 and the ends of the radially extending supports 40 and code tabs 42. Missing code tabs 42 or supports 40 will cause voids in the gland above the O-ring seal 54 and may permit vacuum or pressure to deflect the O-ring seal 54 into a code slot 26 and allow leakage. The combination of properly positioned supports 40 and code tabs 42, along with the code shoulder 24 define a circumferential upper gland to maintain the position and integrity of the O-ring seal 54.

Figure 11:
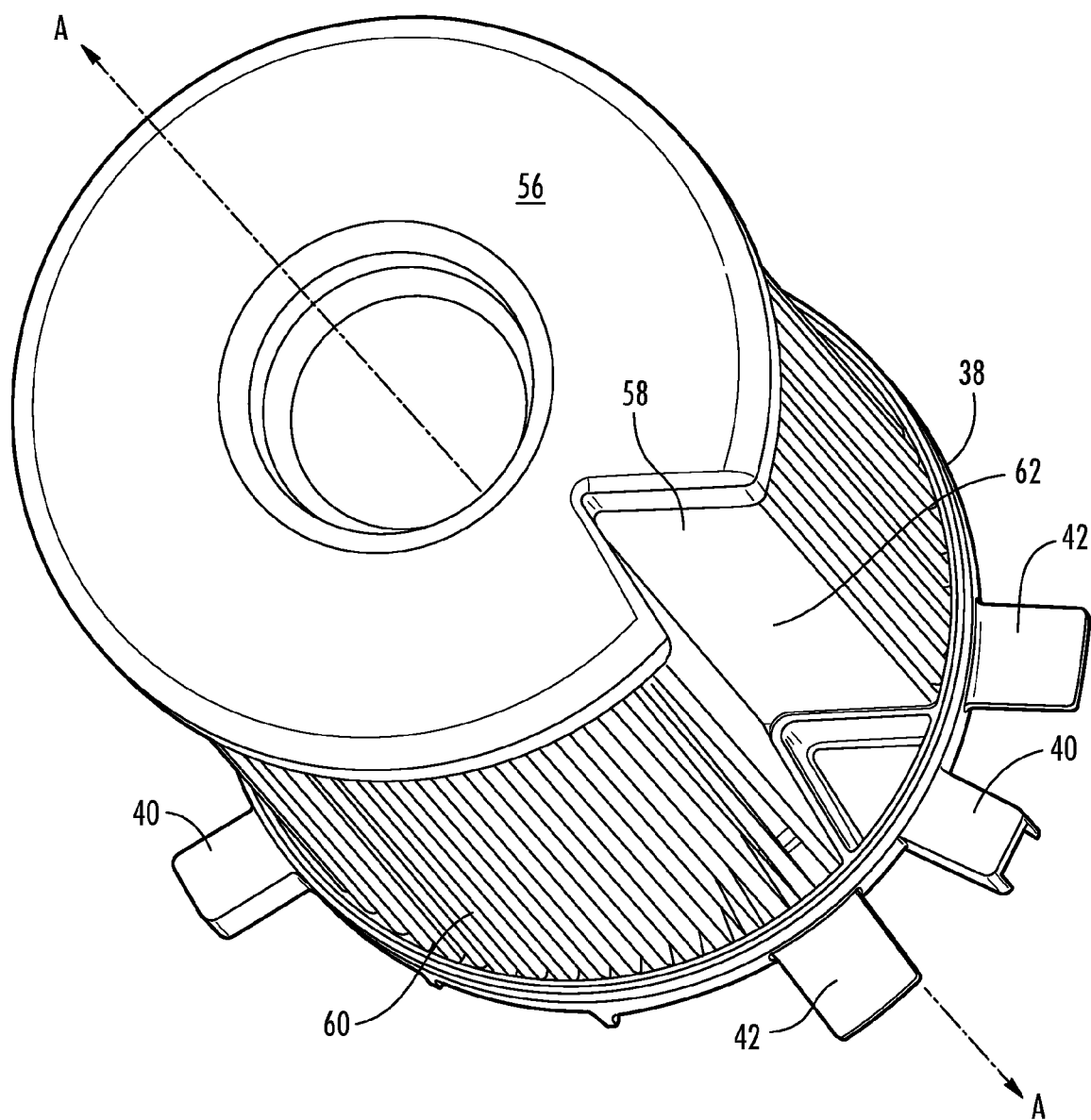
FIG. 11 is an end perspective view of the filter element of FIG. 9.
Figure 12:
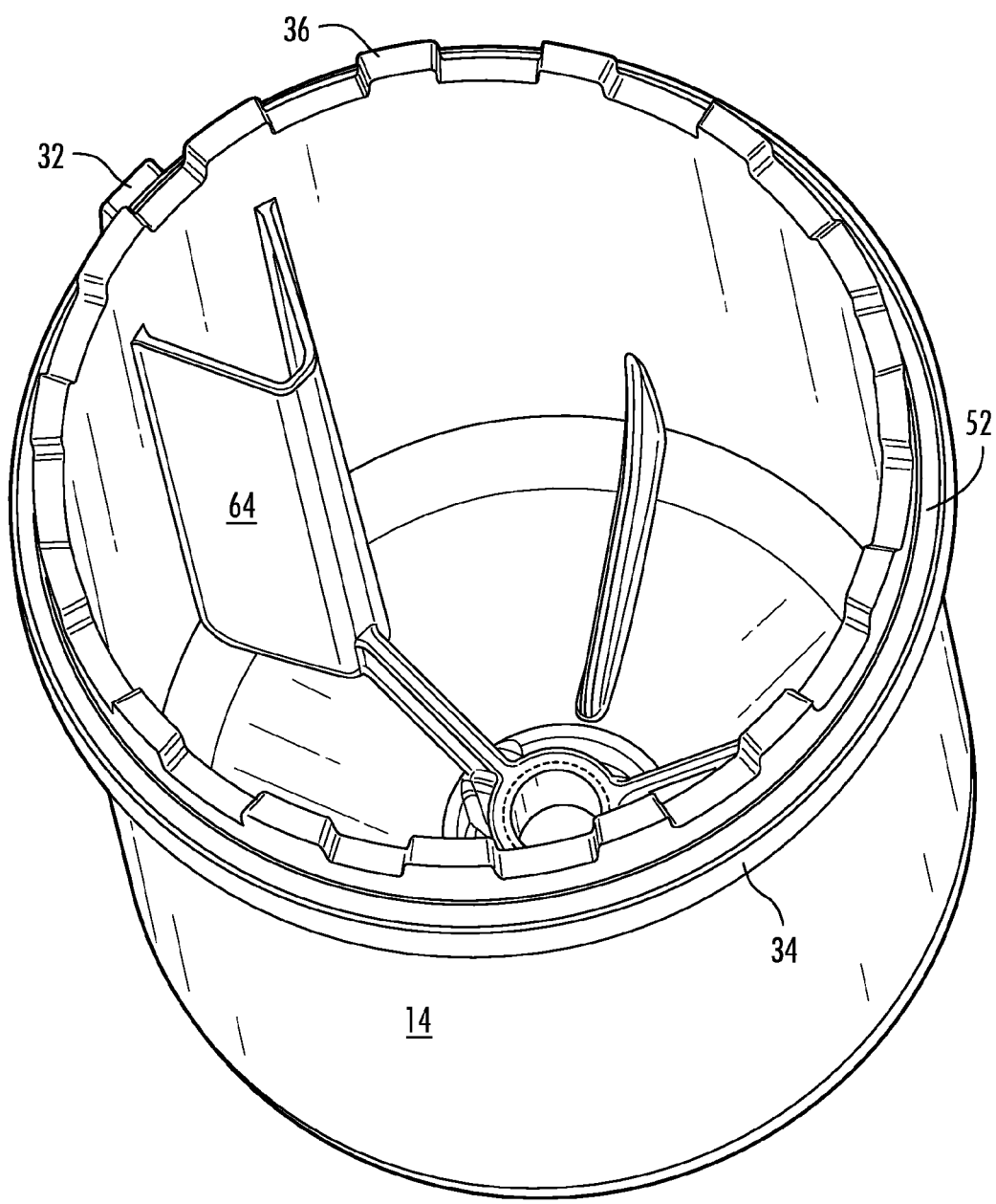
FIG. 12 is a top perspective view of the bowl of FIG. 1 showing details of the castellated upper rim and indexed circumferential shoulder.
Figure 13:
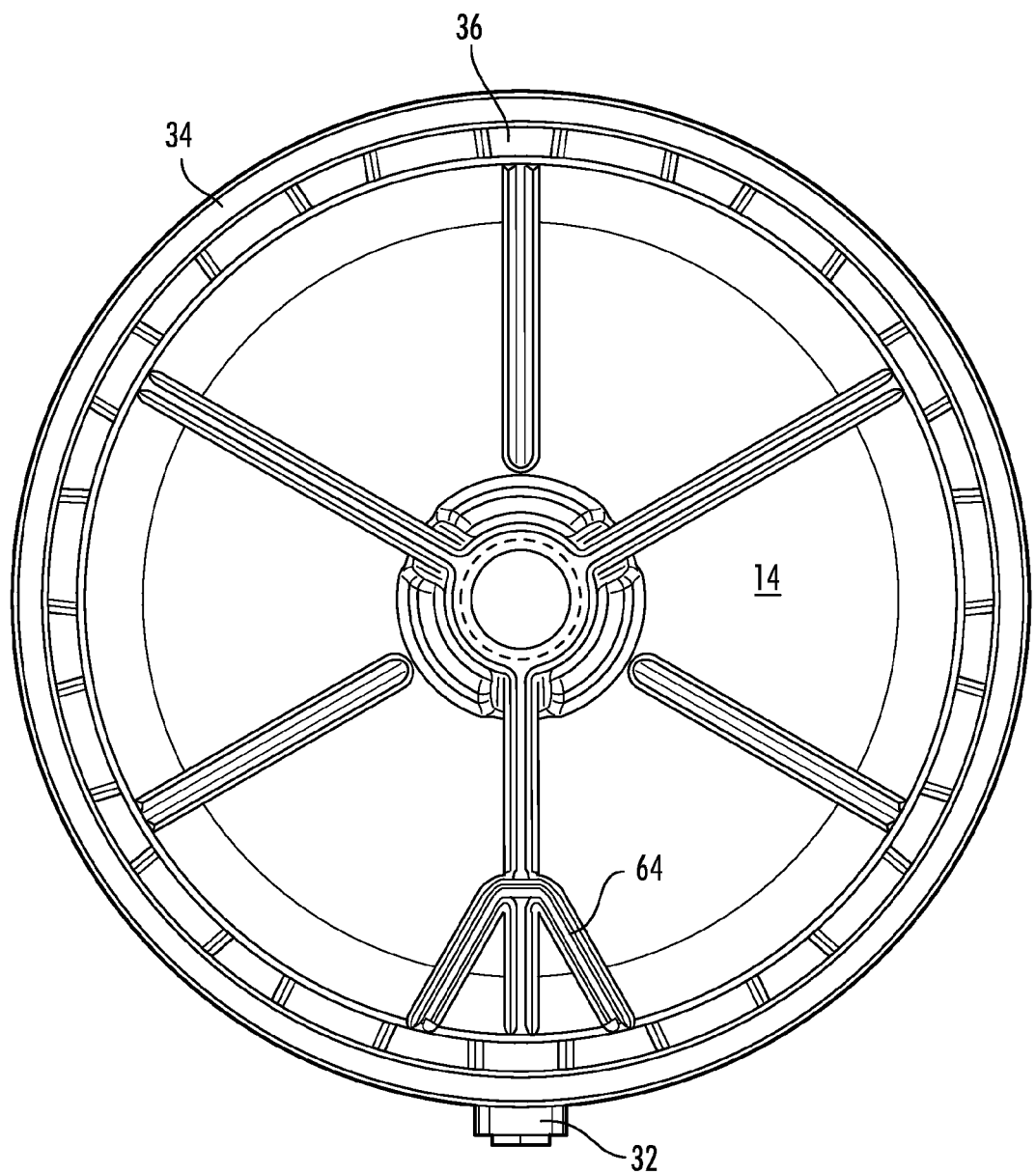
FIG. 13 is a top plan view of the bowl of FIG. 12.

As shown in FIGS. 7-11, a filter element 28 according to aspects of the disclosure has a lower end cap 56 with a V-shaped (wedge-shaped) notch 58. The lower end cap 56 and corresponding features of the upper end cap 38 (as shown in FIG. 11) separate adjacent folds in the cylindrical pleated filter media 60 to define a V-shaped longitudinal channel 62 extending upwardly from the lower end cap 56 to the bottom side of the upper end cap 38. The shape of the lower end cap 56 and the channel 62 in the filter media 60 are configured to mate with a corresponding projection 64 from the inside surface of the bowl 14, best seen in FIGS. 7, 12 and 13. The projection 64 extends from the bottom of the bowl 14 to a position immediately beneath the castellated upper rim 36 of the bowl, traversing a majority of the height of the inside of the bowl 14. The projection 64 is a truncated V-shape complementary to the V-shaped notch 58 and corresponding vertical channel 62 in the filter element 28. As shown in FIG. 7, when the filter element 28 is inserted into the bowl 14, the projection 64 mates with the V-shaped notch 58 in the lower end cap 56 and vertical channel 62 in the filter media 60 to index the lower end cap 56 and filter media 60 to the bowl 14. FIG. 7 also shows that the notch 58 and vertical channel 62 defined by the filter element lower end cap 56 and media 60, respectively, cooperate with the supports 40 and code tabs 42 of the upper end cap 38 to maintain the upper and lower end caps, 38, 56 of the filter element 28 in predetermined angular orientations with respect to each other when the filter element 28 is received in the bowl 14. Because the upper end cap 38 is indexed to the castellated upper rim 36 of the bowl and the lower end cap 56 is indexed to the projection 64 in the bowl, the bowl 14 serves as a rigid connection between the filter element upper and lower end caps 38, 56 in addition to the connection provided by the filter media 60. The support provided by the bowl 14 reduces or eliminates the need for a center support tube connecting the upper and lower end caps 38, 56 of the filter element 28. The shape of the notch 58 in the lower end cap 56 and corresponding projection 64 from the inside surface of the bowl 14 are not critical to the disclosure and can take any form where the connection between the projection 64 and the notch 58 control rotational movement of the lower end cap 56 with respect to the bowl 14. Reducing or eliminating the potential for twisting of the lower end cap 56 with respect to the upper end cap 38 enhances stability of the filter media 60 under clogged conditions and helps prevent failure of the filter element 28 when exposed to high differential pressures.

Together, the upper and lower end caps 38, 56 according to the present disclosure define a single installed orientation of the filter element 28 with respect to the bowl 14. Each of the components of the disclosed filter assembly 10 is keyed to the other independently to define a comprehensive compatibility matrix. The filter element upper end cap 38 is coded and keyed to the header 12 by the radial ends of the supports 40 and code tabs 42 mating in corresponding code slots 26 defined by the code shoulder 24. The bowl 14 is indexed to the header 12 by the stud 32 projecting from the circumferential shoulder 34 of the bowl 14. The filter element 28 is keyed to a single installed orientation with respect to the bowl 14 and serves as a central element of the keyed and coded connection among the components of the filter assembly 10. The radially projecting supports and code tabs traverse the castellated upper rim 36 of the bowl to engage the code slots 26 defined by the code shoulder 24 inside the header 12. It will be noted that different numbers and configurations of supports 40 may be used to index the filter element 28 to the bowl 14 and header 12 instead of a combination of supports 40 and code tabs 42.

The bowl 14, collar 16 and upper and lower end caps 38, 56 are preferably formed from molded plastic. The plastic material of the bowl may be transparent to permit inspection of the water level. The header is preferably formed of cast aluminum, but may alternatively be molded from plastic. The header is cast with a generic code shoulder 24 and code slots 26 are machined to receive compatible filter elements 28.

In an alternative header/collar configuration, the header includes radially protruding threads which are engaged by complementary threads on the collar (not illustrated). The collar is rotated so that the threads bring the collar toward the header. The threads include detents to define the fully installed position of the collar with respect to the header. The engagement between the collar 16 and header 12 illustrated in the disclosed embodiments should be considered interchangeable with a threaded engagement.

In use, the header 12 is physically attached to a vehicle engine or chassis by means of bolts (not shown) passing through the apertures shown in FIGS. 1-3. The header 12 provides an inlet and outlet for the fuel line (not shown). A suitable filter element 28 of the type designed to be used with that particular vehicle and with the particular header code shoulder configuration is inserted into the bowl 14 with the supports 40 and code tabs 42 positioned in the notches on the castellated upper rim 36 of the bowl 14. The bowl 14 and received filter element 28 are then inserted into the header 12 so that the radially projecting ends of the supports 40 and code tabs 42 are received in the code slots 26 defined by the code shoulder 24 inside the header 12. The collar 16 is positioned about the bowl 14 and moved upwardly to engage the bosses 18 on the outside of the skirt 20. The collar 16 is rotated, with the bosses 18 riding up the spiral ramps inside the collar 16 and the collar 16 engaging the circumferential shoulder 34 of the bowl to secure the bowl 14 and received filter element 28 to the header 12.

By providing at least three angularly spaced supports 40, the upper end cap 38 will stay centered and coaxial with the bowl 14. The code slots 26 in the header 12 control upward movement of the bowl 14 and received filter element 28 into the header 12. If the supports 40 and code tabs 42 on the filter element upper end cap 38 do not properly align with the code slots 26, or if the supports 40 and code tabs 42 are not properly received in the notches in the castellated upper rim 36 top of the bowl 14 and the filter element 28 will not be received into the header 12 the proper distance. Unless the bowl 14 and received filter element 28 are properly inserted into the header 12, the collar 16 cannot be rotated properly.

By virtue of the above-described construction, a filter assembly is provided in which an ecological filter unit may be utilized and which provides for an infinite number of configurations to differentiate between filter cartridge assemblies having different flow capabilities, filter unit disposal options and or other characteristics.

While preferred embodiments have been shown and described, various substitutions and modifications may be made thereto. Accordingly, it is understood that the present embodiments have been described by way of illustration and not limitation.

What is claimed:

1. A filter element for filtering fluid comprising:
   a cylinder of pleated filter media at least partially surrounding a central axis with radially spaced outer and inner circumferences, and extending between first and second longitudinal ends to define an open central region for fluid passing through the cylinder of pleated filter media in a radial direction;
   a first end cap connected to the first longitudinal end of the cylinder of pleated filter media and defining a fluid flow aperture opening into said open central region, said first end cap including an outer periphery, a plurality of first indexing structures projecting radially beyond said outer periphery, said plurality of first indexing structures comprising a plurality of coplanar rigid supports extending radially outwardly from said outer periphery at locations angularly spaced from each other around said outer periphery of said first end cap; and
   an imperforate second end cap connected to the second longitudinal end of the cylinder of pleated filter media, said second end cap closing the second end of the cylinder of pleated filter media and having a shape defined by an outer periphery interrupted by at least one second indexing structure, said at least one second indexing structure comprising a notch extending inwardly from said outer periphery of said closed second end cap past the outer circumference of said cylinder of pleated filter media,
   wherein said first and second indexing structures have a predetermined angular relationship to each other about the central axis and said cylinder of pleated filter media is exposed to fluid flow at said outer circumference between said first and second end caps.

2. The filter element of claim 1, wherein the outer circumference of said cylinder of pleated filter media is interrupted by a longitudinally extending channel axially aligned with said second indexing structure.

3. The filter element of claim 2, wherein said second indexing structure is a wedge-shaped notch that narrows towards the central axis and said longitudinally extending channel is also wedge-shaped and generally corresponds in shape and position with said second indexing structure.

4. The filter element of claim 1, wherein said cylinder of pleated filter media has a generally constant sectional configuration in a direction perpendicular to said central axis, except where said second indexing structure defines a void extending inwardly from said outer periphery of said closed second end cap and said cylinder of pleated filter media sectional configuration is generally the same as the shape of said closed second end cap, said closed second end cap and cylinder of pleated filter media thereby defining an inwardly projecting, longitudinally extending channel aligned with said second indexing structure.

5. The filter element of claim 1, wherein said cylinder of pleated filter media includes pleats parallel with each other and with said central axis extending between said first and second longitudinal ends, said second indexing structure separating adjacent pleats of said cylinder of pleated filter media to define a longitudinally extending channel axially aligned with said second indexing structure.

6. The filter element of claim 1, wherein said notch extends radially inwardly from the outer periphery of said closed second end cap more than one half of a radial distance between the outer and inner circumferences of the cylinder of pleated filter media.

7. The filter element of claim 1, wherein the outer circumference of said cylinder of pleated filter media is interrupted by an axially extending channel axially aligned with and originating at said notch.

8. The filter element of claim 7, wherein said channel extends a majority of a height of said cylinder of pleated filter media between said first and second longitudinal ends.

9. The filter element of claim 7, wherein said channel extends between said first end cap and said second end cap.

10. The filter element of claim 1, wherein said fluid is liquid fuel and said liquid fuel flows from said outer circumference through said cylinder of pleated filter media and said cylinder of pleated filter media separates water and removes abrasive particles from said liquid fuel.

* * * * *

UNITED STATES PATENT AND TRADEMARK OFFICE
CERTIFICATE OF CORRECTION

PATENT NO. : 10,702,807 B2
APPLICATION NO. : 13/141347
DATED : July 7, 2020
INVENTOR(S) : Timothy M. Sasur and Jeremiah Sazama Page 1 of 1

It is certified that error appears in the above-identified patent and that said Letters Patent is hereby corrected as shown below:

On the Title Page

Item (63):
Replace "Continuation of application No. 12/317,409, filed on December 23, 2008, now abandoned."
With --Continuation-in-part of application No. 12/317,409, filed on December 23, 2008, now abandoned.--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*